US012559440B2

(12) United States Patent
Anderson et al.

(10) Patent No.: US 12,559,440 B2
(45) Date of Patent: *Feb. 24, 2026

(54) BIOSOLID STORAGE AND DISPERSAL

(71) Applicant: The Andersons Inc., Maumee, OH (US)

(72) Inventors: Charles W. Anderson, Maumee, OH (US); Timothy D. Birthisel, Maumee, OH (US)

(73) Assignee: The Andersons Inc., Maumee, OH (US)

( * ) Notice: Subject to any disclaimer, the term of this patent is extended or adjusted under 35 U.S.C. 154(b) by 685 days.

This patent is subject to a terminal disclaimer.

(21) Appl. No.: 17/714,332

(22) Filed: Apr. 6, 2022

(65) Prior Publication Data

US 2022/0227681 A1 Jul. 21, 2022

Related U.S. Application Data

(63) Continuation of application No. 13/634,373, filed as application No. PCT/US2011/028279 on Mar. 14, 2011, now Pat. No. 11,332,414.

(60) Provisional application No. 61/313,260, filed on Mar. 12, 2010.

(51) Int. Cl.
      *C09K 17/40*        (2006.01)
      *C05G 3/40*         (2020.01)
(52) U.S. Cl.
      CPC .............. *C05G 3/44* (2020.02); *C09K 17/40* (2013.01)
(58) Field of Classification Search
      None
      See application file for complete search history.

(56) References Cited

U.S. PATENT DOCUMENTS

| | | |
|---|---|---|
| 3,655,396 A | 4/1972 | Goto et al. |
| 3,771,994 A | 11/1973 | McConnell et al. |
| 3,939,280 A | 2/1976 | Karnemaat |
| 3,942,970 A | 3/1976 | O'Donnell |
| 4,081,366 A | 3/1978 | O'Donnell |
| 4,256,479 A | 3/1981 | Harrison |
| 4,304,588 A | 12/1981 | Moore, Jr. |
| 4,519,831 A | 5/1985 | Moore |
| 4,521,452 A | 6/1985 | Highsmith |
| 4,578,105 A | 3/1986 | Moore |
| 4,954,134 A | 9/1990 | Harrison .................... B01J 2/28 |
| | | 106/773 |
| 4,981,936 A | 1/1991 | Good, Jr. et al. |
| 4,988,442 A | 1/1991 | Highsmith et al. |
| 5,008,319 A | 4/1991 | Highsmith et al. |
| 5,476,833 A | 12/1995 | Fersch ................... A01N 25/14 |
| | | 504/247 |
| 6,852,142 B2 | 2/2005 | Varshovi |
| 2002/0036365 A1 | 3/2002 | Uhland et al. |
| 2002/0098982 A1 | 7/2002 | Burnham ...................... 504/359 |
| 2003/0104522 A1 | 6/2003 | Ding et al. |
| 2004/0009878 A1 * | 1/2004 | Lynch .................... A01N 25/14 |
| | | 504/367 |
| 2007/0082821 A1 | 4/2007 | Welshimer ............. A01N 25/14 |
| | | 504/367 |
| 2008/0171297 A1 | 7/2008 | Reynolds et al. ................ 432/1 |
| 2009/0126433 A1 | 5/2009 | Piskorz ................... C05D 9/00 |
| | | 71/25 |
| 2009/0250331 A1 | 10/2009 | Hopkins et al. |
| 2010/0300368 A1 | 12/2010 | Myers et al. |
| 2011/0172092 A1 | 7/2011 | Lee ......................... C05F 11/00 |
| | | 502/416 |

FOREIGN PATENT DOCUMENTS

| | | | | |
|---|---|---|---|---|
| AU | 2009902209 | 6/2009 | | |
| EP | 1772444 A1 | 4/2007 | .............. | C05C 1/02 |
| WO | WO-2009134791 A2 * | 11/2009 | .............. | A61P 31/04 |

OTHER PUBLICATIONS

Woolf, Biochar as a soil amendment: A review of the environmental implications, Jan. 2008, Organic eprints, pp. 1-31 (Year: 2008).
Yu et al., Reduced plant uptake of pesticides with biochar additions to soil, Jul. 2009, Chemosphere, vol. 76 iss. 5, pp. 665-671. (Year: 2009).
Sullivan et al., Fertilizing with Biosolids, A Pacific Northwest Extension, pp. 1-15.

\* cited by examiner

*Primary Examiner* — Tracy Liu
*Assistant Examiner* — Samantha J Knight
(74) *Attorney, Agent, or Firm* — MaxGoLaw PLLC

(57) ABSTRACT

A particle is provided that includes 5 wt % to 90 wt % of agricultural biomass, combustion residues, biosolids, or a combination thereof. A binder intermixed with the agricultural biomass, combustion residues, biosolids, or a combination thereof retains the mixture in the form of a particle. The resultant particle creates a use for existing waste streams while also improving soil quality. A process of stabilizing agricultural biomass, combustion residues, biosolids, or a combination thereof particles is also provided that includes combining agricultural biomass, combustion residues, biosolids, or a combination thereof with mineral and/or synthetic chemical fragments having a bulk density of greater than about 40 pounds per cubic foot and a sizing of about 100% passing through a 30 mesh screen and about 50% or more passing through a 200 mesh screen. By adding binder, a particle is formed that is deodorized and/or stabilized.

20 Claims, No Drawings

BIOSOLID STORAGE AND DISPERSAL

CROSS-REFERENCE TO RELATED APPLICATIONS

This application is a continuation application of U.S. application Ser. No. 13/634,373 filed Jan. 28, 2013, which in turn claims priority of PCT Application Serial Number PCT/US11/28279, filed Mar. 14, 2011; that in turn claims priority benefit of U.S. Provisional Application Ser. No. 61/313,260, filed Mar. 12, 2010, the contents of which are hereby incorporated by reference.

FIELD OF THE INVENTION

The invention relates to particles for the application of agricultural biomass, combustion residues, and biosolids, collectively referred to as sustainable plant and soil nutrients, to environmental regions. More particularly, the present invention relates to particles for the long-term storage and effective distribution of these materials, that are water-activatable so as to regulate the applications for improved value and usage efficiency.

BACKGROUND OF THE INVENTION

Waste and byproducts produced from municipal, industrial, or agricultural generators are typically comprised of a quantity of solids generated from biomass from agricultural operations, combustion residues from waste to energy facilities, and biosolids and residues from water or sewage treatment facilities. Over one billion tons of biosolids from municipal sewage sludge, and manure from livestock operations are generated in the United States alone. Disposal or subsequent use of biosolids, combustion residues and biomass materials is generally by application to crop land, range land, or forests, landfill disposal, or release into water bodies.

Combustion residues are generally handled as municipal solid waste (MSW), but there is significant controversy concerning the proper management due to the variable regulatory classification as hazardous or non-hazardous waste. There is a lack of useful federal guidance on this area, and problems such as heavy metal content, leachable caustic salts, crystalline silica, etc. Despite the promising potential for beneficial reuse as fertilizer, less than about 5% is utilized in the U.S.A, with somewhat greater reuse in other countries.

Biomass from agricultural operations, such as manures and crop residues, are generally unregulated. Agricultural biomass is being studied for use as energy producing feedstocks for various fuels such as ethanol, syngas, and 'bio-oil,' but so far there is little such usage relative to the available supply. With some exceptions such as composting, production of 'teas' and soluble salt extraction, animal bedding, burning for fuel, and feed usage, most agricultural biomass is disposed via land or water disposal or open burning. Due to the relatively low value of these materials and the transport costs from production to use sites, the few beneficial uses are generally economically marginal, often requiring some form of public subsidy.

The United States Environmental Protection Agency requires that biosolids from municipal waste facilities be stabilized prior to land application. Several stabilization processes may be used including anaerobic digestion and dewatering. Dewatering, for example, is also used to improve subsequent handling characteristics of the materials. Despite the existing federal regulation, various state regulations, corporate policies, and local ordinances provide obstacles to the beneficial reuse of such materials due to concerns regarding exposure to pathogens, unregulated contaminants such as pharmaceutical residues, and noxious odors.

Previously productive fertilizer sources such as Florida's phosphate rock mines are now exhausted, so exploration into other, sometimes environmentally sensitive, areas is contemplated in order to meet the increasing global demands for fertilizers. Other processes, such as chemical N fixation are closely tied to the increasing cost of energy, so the future anticipated costs of fertilizers is generally projected to rise accordingly.

The historic, and current standard practices of agriculture, even in the more developed nations, have been shown to gradually result in carbon depleted soils that require increasing amounts of nutrient input in order to maintain favorable yields. In most parts of the world, the soils that have supported centuries of human usage in unsustainable cropping practices, including 'slash and burn' agriculture, net organic content removal, and the use of mineral fertilizers, are in various states of carbon depletion. This situation practically accounts for desertification, which today affects over one third of Earth's surface, and is progressing at a rate of 80,000 square miles per year, according to World Bank estimates. Even in more developed nations, where modern agricultural practice is managed for soil conservation, the virtually exclusive use of mineral and chemical fertilizers has resulted in carbon depletion, for example, from roughly 5% in the precolonial past to less than 3% on average in the U.S. today. Additionally, anthropogenic global warming, while publicly controversial, is generally accepted scientific fact, thus the need to reduce atmospheric carbon emissions and increase the rate of carbon sequestration into the soil is well documented.

Due to a growing realization of the need to return carbon sources to the soil as well as providing plant nutrients, it is important to improve the use, safety, and efficiency, and desirability of sustainable plant and soil nutrients for fertilization purposes. Using sustainable plant and soil nutrients as a fertilization nutrient source using previous methods has several drawbacks, however. Storage is commonly required when immediate land application is impossible such as in cold months when the crop is not growing, the soil is unworkable, frozen, or snow covered. Storage of sustainable plant and soil nutrients materials presents many difficulties including the emanation of odors, spontaneous combustion, and material degradation due to microbiological action. The various forms of sustainable soil and plant nutrients as generated are also not compatible with efficient land application and soil incorporation due to the various irregular, fibrous, dusty, malleable, adhesive and/or insoluble particle sizes and shapes of these substances as they are produced. These characteristics prevent practical mixtures of these materials, and special applicators such as mechanically complex manure spreaders and high energy application methods such as soil tillage are required in an attempt to distribute the materials and incorporate them into the soil.

Thus, there exists a need for improved compositions and methods of sustainable plant and soil nutrients storage and fertilization applications.

SUMMARY OF THE INVENTION

A particle is provided that includes 5 wt % to 100 wt % of agricultural biomass, combustion residues, biosolids, or a combination thereof. A binder intermixed with the agricultural biomass, combustion residues, biosolids or mixtures thereof retains the mixture in the form of a particle. The resultant particle creates a use for existing waste streams while also improving soil quality. A process of stabilizing a biosolids particles is also provided that includes combining a biosolid with mineral fragments having a bulk density of greater than about 40 pounds per cubic foot and a sizing of about 100% passing through a 30 mesh screen and about 50% or more passing through a 200 mesh screen. By grinding the various components as required, combining materials, adding binder, agglomerating and drying, a composite particle is formed that is uniform, easy to handle and apply, stable in storage, and deodorized. Through the choice of binder, the particle can be rendered dispersible to rapidly disintegrate into soil.

DETAILED DESCRIPTION OF THE PREFERRED EMBODIMENTS

The following description of the preferred embodiment(s) is merely exemplary in nature and is in no way intended to limit the scope of the invention, its application, or uses, which may, of course, vary. The invention is described with relation to the non-limiting definitions and terminology included herein. These definitions and terminology are not designed to function as a limitation on the scope or practice of the invention but are presented for illustrative and descriptive purposes only. One of ordinary skill in the art readily understands that the individual components of the inventions are interchangeable and their description with respect to a single embodiment does not preclude their use in alternative embodiments.

The present invention relates to a water-dispersible particle or water stable particle for delivery of bioavailable nitrogen and other biosolid materials to a plant or to the soil. The inventive particle provides improved storage capabilities for biosolid materials improving the quality of the delivered material and decreasing negative storage consequences such as odor emanation or degradation.

It is appreciated that control of the water dispersibility of an inventive particle is dictated by a property of at least one particle component, other properties being water solubility, water swellability, and water induced effervescence. It is appreciated that a component that interacts with water to disperse the particle is present in a quantity and distribution consistent with induction of dispersion. By way of example, a substance forming a matrix such as a water interactive binder is operative at amounts of greater than 2 total particle weight percent. Granular water interactive substances that constitute in excess of 2 total particle weight percent are sufficient to induce dispersion.

The invention further relates to a method for making and using the water-dispersible particle. An inventive particle retains its size and shape during handling and application to a desired area and dissolves or crumbles into small particles upon contact with a water overspray within 12 hours. Thus, the durability of the particle allows delivery of the particle to the vicinity of the desired site of action whereupon contact with water sufficient to wet the particle surface causes dispersion of particle components, facilitating distribution of the active agents to the target. As such, the invention has utility as an agricultural biomass, combustion residue, and/ or biosolids stabilizer and fertilizer.

The term "dispersion" in the context of the present invention is intended to mean that an inventive particle disperses by breaking into numerous smaller pieces, not directed to solubilization, upon contact with water. In some embodiments, an inventive particle disperses by breaking up into greater than 100 smaller pieces upon contact with water over a period of time ranging from 1 second to 24 hours. Optionally, an inventive particle disperses into 1,000 to 10,000 smaller pieces over a period of time ranging from 1 second to 24 hours, optionally 1 second to 12 hours. Optionally, a particle disperses into 100 to 10,000 or even more than $10^6$ smaller pieces over a period of 30 seconds to 6 hours. Optionally, a particle disperses as described over a period of 1 minute to 1 hour.

The ability of the inventive material to degrade with water is generally measured in a water dispersibility test. The test involves placing about 10 grams of the inventive material into 100 ml of water at room temperature in a closed glass container. The container is then inverted and the time is observed until the material disperses. After every minute, the container is inverted. The inventive material of the present invention has a dispersibility time of generally less than 15 minutes, optionally with a period of less than 5 minutes, and optionally a period of less than 2 minutes. The inventive particle provides a delivery system for controlled release nitrogen, biosolids, and optional additional agents such as plant nutrients, pesticides, hormones, herbicides, micronutrients and other active ingredients.

An inventive particle optionally includes a mineral and/or synthetic chemical granule at between 10 and 95 total weight percent, where the mineral and/or synthetic chemical fragments forming the granule are optionally intermixed with agricultural biomass, combustion residue, and/or biosolids to form a particle. Optionally, mineral and/or synthetic chemical granules are preformed and then mixed with agricultural biomass, combustion residue, and/or biosolids whereby the biosolids are bound to the mineral granule either by moisture in the biosolid, the addition of binder, a coat, or other means. Optionally, a comparatively less dense cellulosic granule is present from 10 to 90 total weight percent of the medium. An active agent is optionally present. The active agent is optionally present from $1 \times 10^{-5}$ to 10 total weight percent of the medium.

A finished, water dispersible granule of an inventive combination is sized for broadcast distribution and inert towards a contacting active agent. The constituent fragments optionally have a sizing of 100% passing through a 30 mesh screen and 50% or more passing through a 200 mesh screen, or optionally about 100% passing through a 50 mesh screen and 80% or more passing through a 200 mesh screen. The noted mesh sizes and all those mentioned hereafter conform with U.S. standard sieve sizes. The inventive granule optionally contains at least 30 weight percent of a mineral having a bulk density of at least 70 pounds per cubic foot to afford a mineral granule density of at least 70 pounds per cubic foot. A mineral fragment of a mineral granule operative herein illustratively includes powdered dolomite, limestone, gypsum, and pelletized lime. Typically, a mineral granule has a mean particle size of from 500 to 3,000 microns and is formed from two or more mineral fragments aggregated together with a binder. Optionally, an aggregate granule is formed through the mixture of a binder component with a fine grain mineral fragment that has 90% of the fragments having a diameter of less than 150 microns. Such mineral granule is commercially available from The Andersons under the trade names DGLite and DH46.

The particles of the present invention include one or more mineral components optionally selected from the group consisting of dolomite and limestone. Additionally, the mineral components optionally have a bulk density of greater than about 70 pounds per cubic foot, and optionally have a bulk density of about 75 to about 90 pounds per cubic foot. The sizing of the mineral components optionally varies with respect to other ingredients utilized in the granules. In addition to the mineral components otherwise described, other stone or mineral dust compounds conforming with the size and bulk density parameters may be suitable for use with the present invention.

It is appreciated that multiple grades or compositions of mineral components are used in place of a single type of dense mineral component with multiple grades varying in a property of density, granule composition, active agent component, mean particle size, or a combination thereof.

An inventive particle optionally includes one or more biosolids. Biosolids are optionally present between 5 and 90 percent by total particle weight. Biosolids are optionally passing a 50 mesh screen. Biosolids are optionally dewetted into a substantially dry form of such as size so as to be substantially dispersed within mineral fragments in an inventive granule. The types of biosolids operable for use in the invention illustratively include Class A and Class B (classes indicate the degree of pathogen reduction). These biosolids are illustratively produced by treatment processes that generate liquid, dewatered, heat dried, air-dried, composted, digested, or alkaline stabilized materials.

Biosolids are optionally from industrial, municipal, animal, or other source. Sources of biosolids are illustratively discussed in U.S. Pat. No. 6,409,650, the contents of which are incorporated herein by reference. Biosolids are optionally waste derived from animal sources. Animal sources illustratively include humans, non-human primates, goats, sheep, pigs, equine, bovine, rodent, deer, or other animal source. Municipal sewage wastes illustratively include human biowastes, household scraps, sanitary paper products and other biological components, as well as mineral matter and small amounts of chemical products, such as solvents, acids, alkalis, and heavy metals, introduced into the waste stream through the municipal sewer system such as solvents, acids, alkalis, and heavy metals. The animal wastes can be mixed with other organic materials such as sawdust or straw, biochar, or they may be mixed with mineral wastes. Still other suitable sources of biosolids are pulp and paper mill sludges, waste oil products including greases and waxes, and wastes which are rich in organic debris dredged from harbors or estuaries.

A range of treatments can be applied to disinfect the biosolids. Such treatments include pasteurization (dry heat), aerobic (oxidative) or anaerobic digestion, composting, lime stabilization, liquid storage, and dewatering and dry storage.

Without being limited to one mechanism, it is hypothesized that the presence of dry cellulosic or other organic ingredients will absorb additional fluid such as water from interspersed biosolid or from the environment during storage. This water sequestration prevents degradation of the biosolid and emanation of odors increasing storage time of the biosolid material, and also helps prevent spontaneous combustion. The inventive granule increases the usable storage time of biosolids by a factor of 1.1, 1.2, 1.5, 2, 3, 4, 5, 6, 7, 8, 9, 10, 50, 100 times or more. Upon spreading of the inventive particles over a target area, low levels of irrigation are applied, or environmental moisture is precipitated, allowing the inventive particles to disperse releasing the biosolid material if such particles are dispersible or if nondispersible to sift into the underlying soil. Alternatively, inventive particles are simply buried through a conventional terra preta technique. The rapid dispersion embodiments of the inventive particles dramatically reduce secondary movements such motorized equipment movement, wind and water movements, human and mammalian contact; and increases delivery of biosolid or other active agents to the target soil or plant.

In a particular embodiment, biosolids are intermixed with biochar. A particular advantage of using biochar, that is a charcoal created by pyrolysis of biomass or biosolids, is that the interaction of biochar with biosolids not only constitutes a net carbon sequestration but also serves to stabilize the biosolids for storage. It is noted that the intermixing of biosolids with hot biochar constitutes a form of contact pasteurization of the biosolids. While the mechanism remains unclear, biosolids when combined with biochar serve to deodorize the resultant inventive particle. Additionally, it is appreciated that biochar, in retaining the mineral content of the biomass from which it is formed, also constitutes a source of bioavailable potassium as well as to a lesser extent phosphorus and nitrogen. As such, an inventive particle, whether dispersible or nondispersible in water, that contains biosolids as well as biochar constitutes exceptional soil amendment substance, whether inclusive of active agents or purely based on synergistic properties of biosolids and biochar. Typical loadings of biochar in an inventive particle range from 0 to 70 total weight percent. Preferably, when biochar is present, the biochar constitutes between 5 and 90 percent by weight of total particle weight. In a specific example, biochar obtained as a byproduct of syngas production is milled and passed through a 50 mesh screen while still hot and intermixed with biosolids. A representative weight ratio of biosolids to biochar for an inventive particle when both substances are present is between 1:0.25. It is appreciated that an inventive particle inclusive of biosolids, biochar, or a combination thereof is amenable to inclusion of other components detailed herein including binders, mineral components, cellulosic fillers, active agents, and bioavailable nitrogen sources as detailed herein.

A binder component is present in an inventive particle in an amount ranging from 0.1% to 70% by weight of the dry weight of the inventive particle. In a further embodiment, the binder component is present in an amount ranging from 1% to 25% by weight of the dry weight of the inventive particle. A binder component is included in a particle as necessary to produce or promote cohesion in forming a particle capable of retaining a specified form during transport and/or distribution. As such, when a biosolid is in a form suitable to act as both a biosolid component and will substantially bind the mineral fragments together, additional binder is optionally omitted. A binder component is optionally bentonite clay, carbohydrate, protein, lipid, synthetic polymer, glycolipid, glycoprotein, lipoprotein, lignin, a lignin derivative, a carbohydrate-based composition, and a combination thereof. Optionally, the binder component is a lignin derivative and is optionally calcium lignosulfonate. Alternatively, the binder component is optionally selected from the group consisting of: a monosaccharide, a disaccharide, an oligosaccharide, a polysaccharide and combinations thereof. Specific carbohydrate binders illustratively include glucose, mannose, fructose, galactose, sucrose, lactose, maltose, xylose, arabinose, trehalose and mixtures thereof such as corn syrup; celluloses such as carboxymethylcellulose, ethylcellulose, hydroxyethylcellulose, hydroxymethylethylcellulose, hydroxyethylpropylcellulose, methylhydroxyethyl-cellulose, methylcellulose; starches such as amylose, seagel, starch acetates, starch hydroxyethyl ethers, ionic starches, long-chain alkyl starches, dextrins, amine starches, phosphates starches, and dialdehyde starches; plant starches such as corn starch and potato starch; other carbohydrates such as pectin, amylopectin, xylan, glycogen, agar, alginic acid, phycocolloids, chitin, gum arabic, guar gum, gum karaya, gum tragacanth and locust bean gum; vegetable oils such as corn, soybean, peanut, canola, olive and cotton seed; complex organic substances such as lignin and nitrolignin; derivatives of lignin such as lignosulfonate salts illustratively including calcium lignosulfonate and sodium lignosulfonate and complex carbohydrate-based compositions containing organic and inorganic ingredients such as molasses. Suitable protein binders illustratively include soy extract, zein, protamine, collagen, and casein. Binders operative herein also include synthetic organic polymers capable of promoting or producing cohesion of particle components and such binders illustratively include ethylene oxide polymers, polyacrylamides, polyacrylates, polyvinyl pyrrolidone, polyethylene glycol, polyvinyl alcohol, polyvinylmethyl ether, polyvinyl acrylates, polylactic acid, and latex. Optionally, the binder is calcium lignosulfonate, molasses, a liquid corn starch, a liquid corn syrup or a combination thereof. It is appreciated that a watersoluble or waterswellable binder is particularly well suited to impart water dispersibility to an inventive particle.

The binder is generally added to the composition as a solution. The solution is typically provided as a waterbased slurry having about 40% to 50% solids by weight and weighing about 10 pounds per gallon. The binder may also be added and mixed with the other dry ingredients, subsequently mixing in an amount of water.

An aggregate dense mineral containing granule is produced by a number of processes. Optionally, the granule components are wet-granulated through a process of steps, including mixing of various dry components, wet-massing the dry powder mixture with liquid surfactants, binders or the like, alone or with the addition of a solvent to arrive at a suitable consistency for granulating. U.S. Pat. Nos. 6,231, 660 and 6,613,138, each incorporated herein by reference, are representative manufacturing process and composition for dense mineral containing granules conventional to the art.

Upon forming either of the mineral granules, a formulation of an active agent is optionally applied. It is appreciated that one can: apply one or more liquid active agents to the mineral granules, to the mineral fragments, or to the biosolid materials alone or after their combination. Optionally, the active agent is dissolved in a solvent and applied to the preformed mineral granules. Alternatively, it is appreciated that a liquid active agent formulation is incorporated into a binder solution during the formation of a mineral granule.

An active agent in powder form is optionally intermixed with mineral fragments or granules to form the inventive delivery medium combination. Without intending to be bound to a particular theory, electrostatic forces are believed to be operative to retain active agent powder in contact with the granules of an inventive medium combination.

An active agent powder adhered to an inventive granule includes any conventional active agent formulated as a powder. The active agent granules are optionally of a mean size less than 20 percent that of the mean mineral granule size. Optionally, active agent powder is sized such that the powder grain diameter has a mean particle diameter of less than 10% that of the mineral granules mean size. Optionally, the active agent powder has a mean diameter of less than 2% that of the mineral granules particle diameter. Effectively, any conventional active agent powder is operative within the present invention.

Active agents operative as part of an inventive combination illustratively include algicides, bacteriocides, defoliants, desiccants, fungicides, herbicides, insecticides, insect growth regulators, miticides, nematicides, ovicides, pesticides, pheromones, repellents, rodenticides; plant growth hormones and plant growth regulators; pest reproductive control agents; fertilizers; soil nutrients; amendment material; and a combination thereof.

Pesticides suitable to form a liquid coating illustratively include pyrethroids such as bifenthrin, permethrin, deltamethrin, lambda cyhalothrin, cyfluthrin, or betacyfluthrin; organophosphates such as chlorpyrifos; limonoids such as azadirachtin or meliartenin; phenyl pyrazoles or oxadiazines such as indoxacarb; phthalic acid diamides such as flubendiamide and anthranilic diamides. Additionally, it is appreciated that a number of conventional adjuvant systems used to solubilize a pesticide for application as a coating onto a granule of inventive media are rendered more effective by the present invention. By way of example, pyrethroids degrade to yield organic acids that in proximity to certain pesticide powders such as carbamates function to extend the carbamate activity half-life.

Operative pesticide powders within the present invention illustratively include carbamates such as carbaryl (1-naphthyl N-methylcarbamate); neonicotinoids or nitroguanidines such imidacloprid, thiomethoxam, clothianidin or dinotefuran; diacylhydrazines such as halofenozide; neonicotines such as floconamid; organophosphates such as trichlorfon and pyrazoles such as fipronil; and anthranilic diamides such as (3-chloro-2-pyridinyl)-1H-pyrazole-5-carboxamide. It is appreciated that multiple active pesticide agents are readily formulated within a pesticide powder operative herein.

Plant growth hormones and plant growth regulators illustratively include cytokinins, auxins, gibberellins, ethylene, abscissic acid and a combination thereof.

For purpose of this invention, a pest reproductive control agent operative herein includes a pheromone, molting signaling compound or steroid that upon contact with the target pest decreases the reproductive capacity of the pest. A pest reproductive control agent is preferred over a pesticide since a reproductive control agent is specific to a species or narrower group of organisms, does not bioaccumulate, and is less detrimental to predatory or bystander organisms in the pest habitat. Additionally, a reproductive control agent is unlikely to avoid the bait due to ill health effects associated with sampling, as is often the case with a lethal pesticide.

The pest reproductive control agent includes agents such as an acaracide, an antimicrobial, a bactericide, an entomopathogen, a fungicide, a synthetic plant growth regulator such as a gibberlic acid synthesis inhibitor or promoter, an herbicide, an insecticide, a molluskicide, a nemacide, a rodenticide, a pheromone, a chemosterilant, a viricide, an imagocide, a larvicide, an ovicide, a formicide, an aphidicide, a muscacide, a culicicide, an anophelicide, an arachnidcide, and a vespacide. Preferably, an inventive bait particle containing a toxic invertebrate pesticide also contains a mammalian and/or avian ingestion repellant. More preferably, it also contains both mammalian and avian ingestion repellants to lessen the likelihood of incidental ingestion by bystander higher species. Mammalian ingestion repellants illustratively include cadaverine, butyric acid, and capsaicin. Avian repellants include artificial grape flavorant.

Herbicides, for purposes of this invention, include a wide array of chemical and biological compositions which include materials in the functional, or mode of action categories of desiccants, defoliants, abscission agents, algaecides, moss control agents (silvicides), acetyl coenzyme A carboxylase inhibitors, acetolactate synthase enzyme inhibitors, synthetic auxins (action like indoleacetic acid), inhibition of auxin transport, inhibitors of photosynthesis at photosystem II Site A and others with different binding behavior, inhibition of DHP (dihydropteroate) synthase, inhibition of acetyl CoAcarboxylase (ACCase), inhibition of lipid synthesis (not ACCase inhibition), inhibitors of 5-enolpyruvyl-shikimate-3-phosphate (EPSP) synthase or EPSPS inhibitor, inhibition of 4-hydroxyphenyl-pyruvate-dioxygenase (4-HPPD) (bleaching), inhibitors of glutamine synthetase, inhibitors of carotenoid biosynthesis, inhibition of carotenoid biosynthesis at the phytoene desaturase step (PDS) (bleaching), inhibition of all diterpenes, inhibitors of protoporphyrinogen oxidase (PPO), inhibitors of dihydropteroate (DHP) synthase step, inhibitors of indoleacetic acid action, inhibitors of cell wall (cellulose) synthesis, Site A inhibitors of cell wall synthesis, Site B photo system I-electron diverters, inhibition of photosynthesis at photosystem II, inhibitors of mitosis, uncoupling membrane disruptors, inhibition of 4-hydroxyphenyl-pyruvatedioxygenase (4-HPPD), enolpyruvylshikimate 3phosphate synthase enzyme inhibitors, synthetic auxins, uncoupling (membrane disruption), inhibition of VLCFAs (inhibition of cell division), inhibition of mitosis/microtubule organization, microtubule assembly inhibition, and other, unknown mechanisms. Biological, or biorational, herbicides with application to this invention fall generally into the categories of bacteria, fungi, viruses, and plants, including the spore and other reproductive forms thereof, extracts derived therefrom, and including naturally occurring and genetically engineered forms.

More particularly, herbicides commonly fall into one (or more, in the case of mixtures) of the following chemical families: aryloxyphenoxy propionates, arylaminopropionic acid, arsenicals, cineole (such as cinmethylin), cyclohexanediones, sulfonylureas, imidazolinones, pyrimidinylthio-benzoate, triazolopyrimidine, dinitroanilines, pyridazine, phenoxys (or phenoxies), benzoic acids, carboxylic acids (such as DCPA, clopyralid, trichloroacetic acid, and flouroxypyr), quinoline carboxylic acid, semicarbazone, triazines, triazinones, uracils, pyridazinone, phenyl-carbamates, nitriles, benzothiadiazoles, organoarsenicals, phenyl-pyridazine, ureas and substituted ureas (such as diuron, linuron, siduron, tebuthiuron, dymron, etc.), amide (such as propanil and bromobutide), thiocarbamates, organophosphates (such as bensulide), pyrazolium (such as difenzoquat), phosphoric acid compounds (such as glufosinate-ammonium and glyphosate), triazole, pyridazinone, nicotinanilide, pyridinone (such as fluridone), isoxazolidinone, diphenylethers, Nphenylphthalimides, oxadiazole, triazolinone, chloroacetamides, oxyacetamides, carbamate (such as asulam), phthalamate, phthalamate semicarbazone, nitrile, N-phenylphthalimides, oxadiazole, triazolinone, acetamides, benzoylisoxazole, isoxazole, pyrazole, pyrazolium, triketone, and benzofuran, biological herbicides including *Puccinia canaliculata, Puccinai jacea, Xanthomonas campestris, Alternaria destruens, Colletotrichum gloeosporioides, Dendryphion papaveraceae, Pseudomonas syringae*, including any varieties or subspecies thereof. Examples of plant extract herbicides are corn gluten meal and the allelopathic exudates of various plants.

A fertilizer is optionally bioavailable nitrogen. Bioavailable nitrogen is nitrogen in a form that fills a nutritional requirement of a plant either directly, where the plant is capable of physiological processing of a nitrogen containing ingredient, or indirectly, where another organism such as a bacterium must first act on the nitrogen containing ingredient to produce a nitrogen form usable by the plant. Illustrative examples of a bioavailable nitrogen containing ingredient include methylene urea oligomers, oxamide, urea formaldehyde-based compounds, dicyandiamide, crotilidiene diurea, nitrocellulose, metal ammonium phosphates, ammonium nitrate, ammonium sulfate, urea, coated urea, monoammonium phosphate, diammonium phosphate, calcium nitrate, isobutylidene diurea and other fertilizers as detailed herein.

Optionally, the bioavailable nitrogen containing ingredient is a methylene urea oligomer or a mix of methylene urea oligomers as represented by the formula $NH_2CONH$ $(CH_2NHCONH_2)_nH$, where n is an integer from 1-10. Illustrative examples of methylene urea oligomers include methylene diurea ($NH_2CONHCH_2NHCONH_2$), dimethylene triurea ($NH_2CONHCH_2NHCONHCH_2NHCONH_2$), trimethylene tetraurea and tetramethylene pentaurea. Optionally a mix of methylene urea oligomers such as the material commercially sold as Nutralene® by Nu-Gro Technologies, Canada, the material sold commercially as Methex-40 by Homestead Corporation and the material sold commercially as Nitroform® are used. A mix of methylene urea oligomers suitable for incorporation in the granules of the present invention are methylene urea oligomer aggregates having a mean aggregate domain size less than 420 micrometers.

Where the active ingredient is a fertilizer, soil nutrient or amendment material, the fertilizer, soil nutrient or amendment material active ingredient is optionally present in an amount ranging from 0.05% to 80% by weight of the total dry weight of the granule. Optionally, the fertilizer, soil nutrient or amendment material active ingredient is present in an amount ranging from 0.1% to 30% by weight of the total dry weight of the granule. Optionally, the fertilizer, soil nutrient or amendment material active ingredient is present in an amount ranging from 0.5% to 10% by weight of the total dry weight of the granule.

One or more lightweight additives are optionally included with the mineral and biosolid materials to obtain the desired bulk density of the finished granule. The manufactured granules optionally include about 5 wt % to about 25 wt % of the additives. The lightweight additives are optionally inert compounds having a bulk density of less than 35 pounds per cubic foot and a sizing of at least 20% passing through a 40 mesh screen. Optionally, the additives have a sizing of 100% passing through a 40 mesh screen. The lightweight material is optionally a non-fibrous material as indicated by the sizing parameters. Lightweight additives illustratively include expanded silica, fly ash, hydrated lime, wheat flour, wood flour, ground wheat straw, corn cob, corn stover, cellulose and soy flour. However, other inert compounds meeting the bulk density and sizing specifications may be suitable for use in the present inventive composition.

Some embodiments include the use of wood flour resulting from finely milled wood particle board. The wood particle board contains approximately 10 wt % of a urea-formaldehyde resin. Optionally, wheat straw flour resulting from finely milled wheat straw particle board. The wheat straw particle board contains a diphenylmethane diisocyanate resin. In both cases, the additional resin assists in producing a granule that does not degrade during handling but breaks down upon exposure to water.

Optionally, a coating is included to provide a harder outer shell to an inventive granule. The coating is generally added to the composition at 1 wt % or less. The coating material is added directly to the dried, finished granules and enhances the strength of the granules to prevent degradation. Optionally, coating material is polyvinyl alcohol. However, other coating compositions capable of strengthening the granules without adversely affecting the desired dispersal properties are suitable for use with the present invention.

The composition of the present invention is generally produced by first creating an admixture of the noted components within the specified ranges. The mixing of the components may occur in either a batch or continuous mixing process. Conventional mixing devices are suitable for use with the present invention. The components should be thoroughly mixed at conditions which prevent degradation or compaction of the materials. During the mixing step, the binder composition is optionally added to the mixture as a solution. Optionally, at least part of the water soluble binder may be added to the pelletizing apparatus during pelletizing. Additional water, up to about 15% by weight, may be necessary for agglomeration of the materials in the inventive composition.

The admixture is then fed into a pelletizing apparatus to produce the manufactured granules of the present invention. Conventional pelletizing equipment is suitable for use in producing the granule in pellet form. Optionally, pelletizing equipment is a pelletizing pan. Additionally, drum granulators or other types of granulation equipment may be used to produce the granules of the present invention.

Water is optionally added to the mixture during the pelletizing step of the process to assist in granulation of the material. The water is generally added at an amount which results in no greater than 35% by weight in the granules.

In accordance with the present invention, the operation of a pelletizing pan may vary with the specific formulation or ingredients in order to produce a granule with the preferred properties. For example, feed rates and locations of the admixture or the water, the angle of the pan, the speed of rotation of the disc, or the depth of the pan may be varied to produce the desired product. One skilled in the art of pelletizing is capable of recognizing the variables and making adjustments to obtain the inventive granules in pellet form.

The inventive particles are then dried to a temperature of from about 240° F. to about 300° F. to remove excess water utilized during the agglomeration of the components. The pellet is dried to a total moisture content of 8% or less in accordance with ASTM standard D 5033 Volume 11.04. The particles optionally have total moisture content of 2.0% or less. The upper temperature limitation during the drying step prevents the degradation or burning of the organic binder. The granules are optionally dried in conventional drying units such as, for example, a fluid bed dryer or a rotary dryer.

The resulting granular material is then screened to remove oversized and undersized particles. The improperly sized material is optionally recycled to the mixing stage or milled to the appropriate size and rescreened. Optionally, the finished product is sprayed with a lightweight mineral oil to prevent dusting of the product in bulk form.

The size of particles is determined by the size guide number/uniformity index system used in the fertilizer industry. The granules of the present invention optionally have a size guide number between 100 and 230 and a uniformity index of at least 40. The size guide number describes the relative particle size and is obtained by multiplying the average particle size, in millimeters, by 100. The uniformity index is a comparison of large particles to small particles. The index is expressed as a whole number between 1 and 100 with higher numbers indicating better uniformity and tighter size range. Additionally, the sizing is optionally determined in accordance with ASTM E 728-91 Volume 11.04 wherein the sizing is optionally 20% or more passing through a 14 mesh screen and retained on a 40 mesh screen.

The ability of the particles of the present invention to degrade with water is optionally measured in a water dispersability test. The test involves placing about 10 grams of the granular material into 100 ml of water at room temperature in a closed glass container. The container is then inverted and the time is observed until the material completely disperses. After every minute, the container is inverted. The granules of the present invention optionally have a dispersability time of less than 3 minutes.

The strength of the particles is determined through the crush strength test, ASTM E 382 Volume 3.06, and resistance to attrition (RTA) test, ASTM E 728-91 Volume 11.04. The manufactured granules of the present invention optionally have a crush strength between 2 and 8 pounds on an 8 mesh pellet. Additionally, the particles optionally have an RTA value of at least 85%.

The resulting particles of the present invention optionally have a smooth surface and are spherical in shape. The spherocity lends to desired flow characteristics of the granules in bulk form. The angle of repose is a test utilized to measure the ability of particles to flow in bulk form. The test is conducted on a 14×30 mesh sample. The particles of the present invention optionally all have an angle of repose of 35 degrees or less.

Various aspects of the present invention are illustrated by the following nonlimiting examples. The examples are for illustrative purposes and are not a limitation on any practice of the present invention. It will be understood that variations and modifications can be made without departing from the spirit and scope of the invention.

Examples 1-3

Limestone fragments sized to 100% passing through a 50 mesh screen and 80% or more passing through a 200 mesh screen with a bulk density of greater than 75 pounds per cubic foot are combined with dewetted biosolids from municipal sources. The specified dry based raw materials of limestone fragments and biosolids are weighed out and placed in a Forberg type mixer made by Paul O. Abbe, Inc. of Little Falls, N.J. The mixer is run for about one minute in order to thoroughly mix the materials before adding the binder composition. The binder composition, in solution form, is added to the materials over a one minute time period and then mixed for another minute.

The resulting wet mixture is then fed into a 36" rotating pelletizing pan through a Vibra Screw™ feeder. The pan angle is 50° (from horizontal). The pan depth is maintained at 6 inches while the pan speed is 26 rpm. Additional water is sprayed into the pelletizer to assist in the agglomeration process. The granules, in pellet form, are collected from the pelletizing pan and placed in a conventional lab oven. The granules are then heated to a temperature of about 240° F. to about 300° F. to remove excess water producing a granule with less than 2% moisture content.

The same process is used to produce granules made with fragments of dolomite and gypsum.

Example 4

The particles of Examples 1-3 are placed in a non-humidity regulated storage environment separated from each other and from biosolids of equal mass to the biosolid component of each granule. The biosolids and each granule are divided so that odors from one batch are not readily transferred to adjacent batches. The material is stored for three months during which humidity and temperature levels within the storage chamber adjust as per ambient atmospheric conditions. During storage and at the end of the storage term the presence of several odorous compounds emanating from the stored material are collected in adsorption tubes filled with Tenax packing and/or activated carbon or by canister point air sampling depending on the target analyte and subsequently measured. Measurement is by adsorption, gas chromatograph, or single compound analyzer such as a hydrogen sulfide ($H_2S$) meter. Compounds analyzed are listed in Table 1.

TABLE 1

Adapted from the Guide to Field Storage of Biosolids, United States Environmental Protection Agency, EPA/832-B-00-007, July 2000, the contents of which are incorporated herein by reference.

| Compound | Odor Character | Odor Treshold μV 1 | (μg/1) |
|---|---|---|---|
| Nitrogenous compounds | | | |
| Ammonia | Sharp pungent | 5.2 ‡ | (150) |
| Butylamine | Sour, ammonia-like | 1.8 ‡ | (6200) |
| Dibutylamine | Fishy | (0016) † | |
| Diisopropylamine | Fishy | 1.8 ‡ | (1300) |
| Dimethylamine | Putrid, fishy | 0.13 | (470) |
| Ethylamine | Ammonical, fishy | 0.95 ‡ | (4300) |
| Methylamine | Putrid, fish | 3.2 ‡ | (2400) |
| Triethylamine | Ammonical, fishy | 0.48 ‡ | (0.42) |
| Trimethylamine | Ammonical, fishy | 0.00044 ‡ | |
| Nitrogenous Heterocyclics | | | |
| Indole | Fecal, nauseating | (0.00012-0.0015) † | |
| Skatole | Fecal, nauseating | (0.00035-0.0012) † | |
| Pyridine | Disagreeable, burnt pungent | 0.17 ‡ | (0.95) |
| Sulfur-containing compounds | | | |
| Dimethyl sulfide | Decayed vegetables | (0.0003-0.016) † | |
| Diphenyl sulfide | Unpleasant | (0.0026) † | |
| Dimethyl disulfide | Vegetable sulfide | (1.00) † | |
| Hydrogen sulfide | Rotten eggs | 8.1 ‡ | (0.000029) |
| Sulfur dioxide | Pungent, irritating | 1.1 ‡ | (0.11) |
| Amyl mercaptan | Unpleasant, putrid | (0.0003) † | |
| Allyl mercaptan | Strong garlic, coffee | (0.0000005) † | |
| Benzyl mercaptan | Unpleasant, strong | (0.013) † | |
| Crotyl mercaptan | Skunk-like | (0.00000043) † | |
| Ethyl mercaptan | Decayed cabbage | 0.06076 ‡ | (0.0000075) |
| Methyl mercaptan | Decayed cabbage, sulfidy | 0.0016 ‡ | (0.000024) |
| Propyl mercaptan | Unpleasant | 0.0000025-0.000075 | |
| n-butyl mercaptan | Skunk, unpleasant | 0.00097 | (0.000012) |
| Thiocresol | Skunk, rancid | (0.0001) † | |
| Thiophenol | Putrid, garlic-like | (0.00014) † | |
| Other chemicals or compounds | | | |
| m-Cresol | Tar-like, pungent | 0.000049-0.0079 | (37) |
| n-butyl alcohol | Alcohol | 0.84 ‡ | |
| Chlorine | Pungent, suffocating | 0.31 ‡ | (0.0020) |
| Acetaldehyde | Pungent fruity | 0.050 ‡ | (0.034) |

| Compound | Odor Character | Odor Threshold μV 1 | (μg/1) |
|---|---|---|---|
| Nitrogenous compounds | | | |
| Ammonia | Sharp pungent | 5.2 ‡ | (150) |
| Butylamine | Sour, ammonia-like | 1.8 ‡ | (6200) |
| Dibutylamine | Fishy | (0.016) † | |
| Diisopropylamine | Fishy | 1.8 ‡ | (1300) |
| Dimethylamine | Putrid, fishy | 0.13 | (470) |
| Ethylamine | Ammonical | 0.95 ‡ | (4300) |
| Methylamine | Putrid, fish | 3.2 ‡ | (2400) |
| Triethylamine | Ammonical, fishy | 0.48 ‡ | (0.42) |
| Trimethylamine | Ammonical, fishy | 0.00044 ‡ | |
| Nitrogenous Heterocyclics | | | |
| Indole | Fecal, nauseating | (0.00012-0.0015) † | |
| Skatole | Fecal, nauseating | (0.00035-0.0012) † | |
| Pyridine | Disagreeable, burnt pungent | 0.17 ‡ | (0.95) |
| Sulfur-containing compounds | | | |
| Dimethyl sulfide | Decayed vegetables | (0.0003-0.016) † | |
| Diphenyl sulfide | Unpleasant | (0.0026) † | |
| Dimethyl disulfide | Vegetable sulfide | (1.00) † | |
| Hydrogen sulfide | Rotten eggs | 8.1 ‡ | (0.000029) |

TABLE 1-continued

Adapted from the Guide to Field Storage of Biosolids, United States Environmental Protection Agency,
EPA/832-B-00-007, July 2000, the contents of which are incorporated herein by reference.

| | | | | |
|---|---|---|---|---|
| Sulfur dioxide | Pungent, irritating | 1.1 ‡ | | (0.11) |
| Amyl mercaptan | Unpleasant, putrid | | (0.0003) † | |
| Allyl mercaptan | Strong garlic, coffee | | (0.000005) † | |
| Benzyl mercaptan | Unpleasant, strong | | (0.013) † | |
| Crotyl mercaptan | Skunk-like | | (0.00000043) † | |
| Ethyl mercaptan | Decayed cabbage | 0.00076 ‡ | | (0.0000075) |
| Methyl mercaptan | Decayed cabbage, sulfidy | 0.0016 ‡ | | (0.000024) |
| Propyl mercaptan | Unpleasant | 0.0000025-0.000075 | | |
| n-butyl mercaptan | Skunk, unpleasant | 0.00097 | | (0.000012) |
| Thiocresol | Skunk, rancid | | (0.0001) † | |
| Thiophenol | Putrid, garlic-like | | (0.00014) † | |
| Other chemicals or compounds | | | | |
| m-Cresol | Tar-like, pungent | 0.000049-00079 | | (37) |
| n-butyl alcohol | Alcohol | | 0.84 ‡ | |
| Chlorine | Pungent, suffocating | 0.31 ‡ | | (0.0020) |
| Acetaldehyde | Pungent fruity | 0.050 ‡ | | (0.034) |

† O'Neill and Phillips, 1992; Vesilind et al, 1986; converted from weight by volume concentration (mg/m$^2$) to µg/l
‡ Amoore and Hautala, 1983; µl/l is the odor threshold for dilutions in odor-free air, and µg/l is the odor threshold; both units are equivalent to parts per million.

Odor emanation is directly related to breakdown of the biosolid material such as by bacterial action. By combining biosolids in inventive granules, the odor emanation of all tested compounds is reduced by 50 percent or more relative to an equal mass amount of unbound biosolid.

Example 5

The process of Example 4 is repeated in which half of the biosolids are replaced with 100% of the biochar passing through a 30 mesh screen and intermixed with the remaining components. The resultant particles were stored and analyzed as in Example 4 and provide superior odor reduction relative to those samples tested in Example 4.

Various modifications of the present invention, in addition to those shown and described herein, will be apparent to those skilled in the art of the above description. Such modifications are also intended to fall within the scope of the appended claims.

It is appreciated that all materials and reagents are obtainable by sources known in the art unless otherwise specified.

Patents and publications mentioned in the specification are indicative of the levels of those skilled in the art to which the invention pertains. These patents and publications are incorporated herein by reference to the same extent as if each individual application or publication was specifically and individually incorporated herein by reference.

The foregoing description is illustrative of particular embodiments of the invention, but is not meant to be a limitation upon the practice thereof. The following claims, including all equivalents thereof, are intended to define the scope of the invention.

The following references are incorporated herein in their entirety.

REFERENCES

ASTM. 1968. Basic principles of sensory evaluation. ASTM Special Technical Publ., No. 433. Amer. Soc. For Testing and Materials. Philadelphia, Pa.

ASTM. 1989. Standard recommended practices for referencing suprathreshold odor intensity. E544-75(88). Annual Book of Standards, Vol. 11.5. Amer. Soc. For Testing and Materials, Philadelphia, Pa.

ASTM. 1991. Standard practice for determination of odor and taste thresholds by a forced-choice ascending concentration series methods of limits. E679-91. 1991. Annual Book of Standards, Vol. 11.5. Amer. Soc. For Testing and Materials. 5 p.

Barnebey & Sutcliffe Corporation. 1974. Scentometer: An Instrument for Field Odor Measurement. Columbus, Ohio.

Borgatti, D., G. A. Romano, T. J. Rabbitt, and T. J. Acquaro. 1997. The 1996 Odor Control Program for the Springfield Regional WWTP. New England WEA Annual Conf., 26-29 Jan. 1997, Boston, Mass.

Bowker, R. P. G., J. M. Smith, and N. A. Webster. 1989. Odor and corrosion control in sanitary sewerage systems and treatment plants. Noyes Data Corp., Park Ridge, N.J., U.S.A.

Bruvold, W. H., S. M. Rappaport, T. C. Wu, B. E. Bulmer, C. E. DeGrange, and J. M. Kooler. 1983. Determination of nuisance odor in a community. J. Water Pollut. Control Fed. 53:229-233.

Bruvold, W. H. Laboratory panel estimation of consumer assessments of taste and flavor. J. Appl. Psychol. 54: 326

Buonicore, A. J. and W. T. Davis (eds.). 1992. Air pollution engineering manual. Air & Waste Management Association. Van Nostrand Reinhold, N.Y.

Dravnieks, A. 1985. Atlas of odor Character Profiles, sponsored by Section E-18.04.12 on Odor Profiling of Subcommittee E-18.04 on Instrumental-Sensory Relationships, ASTM Committee E-18 on Sensory Evaluation of Materials and Products. Philadelphia, Pa.

Hentz, L. H. 1997. The Chemical, Biological and Physical Origins of Biosolids Emissions: A Review, Post, Buckley, Schuh & Jernigan, Inc. Bowie, Md.

Leonardos, G., D. Kendall, and N. Barnard. 1969. Odor Threshold determinations of 53 odorant chemicals. Air Pollut. Control Assoc. J. 19 (2):91-95.

Lue-Hing, C., D. R. Zenz, and R. Kuchenrither. 1992. Municipal Sludge Management-Processing, Utilization and Disposal, Water Quality Management Library (Volume 4), Technomic Pub Co., Inc. Lancaster, Pa.

Miedema, H. M. E. and J. M. Ham. 1988. Odour annoyance in residential areas. Atmos. Environ. 2:2501-2507.

National Research Council. 1979. Odors from Stationary and Mobile Sources. National Acad. Sci., Washington, D.C.

Rosenfeld, P. 1999. Characterization, Quantification, and Control of Odor Emissions from Biosolids Application to Forest Soil. Ph.D. Dissertation. University of Washington, Seattle, Wash.

Ruth, J. H. 1986. Odor thresholds and irritation levels of several chemical substances: A Review. Am. Ind. Hyg. Assoc. J. 47:A142-A151.

U.S. EPA. 1973. National Survey of the Odor Problem, Phase III. A Study of the Social and Economic Impact of Odors. La Jolla Calif., Copley Intl. Corp., EPA Report No. EPA-650/5-73-001, EPA, RTP. Phase I, 1970, Phase II, 1971.

Verschueren, K. 1996. Handbook of environmental data on organic chemicals, 3rd ed. Van Nostrand Reinhold, N.Y. 2064 p.

Vesilind, P. A., Hartman, G. C., and Skene, E. T. 1986. Sludge Management and Disposal for the Practicing Engineer, Lewis Publishers, Inc., Chelsea, Mich.

Wilby, F. V. 1969. Variation in recognition odor threshold of a panel. J. Air Pollut. Contr. Assoc. 19 (2):96-100.

Winneke, G. and J. Kastka. 1977. Odor pollution and odor annoyance reactions in industrial areas of the Rhine-Ruhr region, pp. 471-479. In Le Magnead MacLeod. (Ed.), Olfaction and Taste. IV. London Yonkers. 1997. Process compatibility testing D. Odor. In Specifications for Furnishing and Delivering Liquid Emulsion type polymer (40-50 percent active) for Centrifuge dewatering of sludge. Yonkers Joint WWTP, Ludlow Dock, South Yonkers, N.Y.

The invention claimed is:

1. A stabilizing particle consisting of:

5 wt % to 90 wt % of biochar produced by pyrolysis having a particle size of less than 297 microns;

an inorganic component consisting of a plurality of mineral fragments alone or in combination with a micronutrient, said plurality of mineral fragments having a bulk density of greater than 40 pounds per cubic foot and a sizing of about 100 wt % being less than 595 microns, and less than 50 wt % of said plurality of mineral fragments being less than 595 microns and greater than 74 microns, and more than 50 wt % being smaller than 74 microns, said plurality of mineral fragments being selected from a group consisting of: dolomite, limestone, gypsum, pelletized lime, or combinations thereof;

a binder to retain said biochar and said inorganic component in the form of a composite particle in which said biochar and said inorganic component are discrete components that are mixed thoroughly in the particle; and at least one active agent present from 0.05 to 80 wt %, the at least one active agent is a combination of a fertilizer and an ingredient selected from the group consisting of pesticides, herbicides, or pest reproductive control agents.

2. The particle of claim 1 wherein the at least one active agent is present from 0.1% to 30 wt %.

3. The particle of claim 1 wherein the at least one active agent is present from 0.5% to 10 wt %.

4. The particle of claim 1 wherein said fertilizer is bioavailable nitrogen.

5. The particle of claim 4 wherein said bioavailable nitrogen comprises methylene urea oligomers, oxamide, urea formaldehyde-based compounds, dicyandiamide, crotilidiene diurea, nitrocellulose, metal ammonium phosphates, ammonium nitrate, ammonium sulfate, urea, coated urea, monoammonium phosphate, diammonium phosphate, calcium nitrate, and isobutylidene diurea.

6. The particle of claim 4 wherein said bioavailable nitrogen is a methylene urea oligomer or a mix of methylene urea oligomers as represented by the formula $NH_2CONH(CH_2NHCONH_2)_nH$, where n is an integer from 1-10.

7. The particle of claim 6 wherein said methylene urea oligomer comprises one or more of methylene diurea ($NH_2CONHCH_2NHCONH_2$), dimethylene triurea ($NH_2CONHCH_2NHCONHCH_2NHCONH_2$), trimethylene tetraurea, and tetramethylene pentaurea.

8. The particle of claim 7 wherein a mixture of said methylene urea oligomer is a methylene urea oligomer aggregate having a mean aggregate domain size less than 420 micrometers.

9. The particle of claim 1 wherein said binder is water soluble and renders the particle dispersible into at least 100 pieces upon contact with water.

10. The particle of claim 1 wherein said binder is lignin, carbohydrate, protein, lipid, synthetic polymer, glycolipid, glycoprotein, lipoprotein, or combinations thereof.

11. The particle of claim 1 wherein said active agent is a powder having a mean particle size less than 20 percent of the mean mineral granule size.

12. The particle of claim 1 wherein said active agent is a liquid coating.

13. The particle of claim 1 wherein said biochar is from municipal source, animal source, or combinations thereof.

14. The particle of claim 1 wherein said particle disperses upon contact with water into at least from about 100 pieces to 1,000 pieces in a time period of less 24 hours.

15. The particle of claim 1 wherein said particle disperses upon contact with water into from at least 100 to 1,000 pieces in a time period of less than 15 minutes.

16. A process of delivering biochar to the environment comprising:

spreading the particles of claim 1 to an environmental area.

17. A stabilizing particle consisting of:

5 wt % to 90 wt % of biochar produced by pyrolysis having a particle size of less than 297 microns;

an inorganic component consisting of a plurality of mineral fragments having a sizing of about 100 wt % being less than 595 microns, and less than 50 wt % of said plurality of mineral fragments being less than 595 microns and greater than 74 microns, and more than 50 wt % being smaller than 74 microns;

an organic binder to retain said biochar in the form of an intermixed composite particle, said binder is water soluble and renders the particle dispersible into at least 100 pieces upon contact with water, the binder imparting a crush strength between 2 and 8 pounds on an 8 mesh pellet size of the particle; and at least one active agent present from 0.05 to 80 wt %, the at least one active agent is a combination of a fertilizer and an ingredient selected from the group consisting of pesticides, herbicides, or pest control agents.

18. A soil nutrient consisting of:

a plurality of composite particles with a moisture content of 8% of less, the composite particles including a plurality of discrete inorganic components intermixed with a plurality of discrete biochar components produced by pyrolysis and a binder retaining said biochar components and inorganic components in a mixed particle of discrete components, and wherein the discrete components are separately dispersible upon contact with water and wherein the inorganic components consist of a plurality of mineral fragments having a sizing of about 100 wt % being less than 595 microns, and less than 50 wt % of said plurality of mineral fragments being less than 595 microns and greater than 74 microns, and more than 50 wt % being smaller than 74 microns;

wherein the plurality of discrete biochar components produced by pyrolysis have a particle size of less than 297 microns; and at least one active agent present from 0.05 to 80 wt %, the at least one active agent is a combination of a fertilizer and an ingredient selected from the group consisting of pesticides, herbicides, or pest control agents.

19. The particle of claim 18 wherein said inorganic component includes mineral fragments having a bulk density of greater than about 40 pounds per cubic foot.

20. The particle of claim 18 wherein said composite particles further include a coating.

* * * * *